United States Patent
Takaki et al.

(10) Patent No.: US 11,878,670 B2
(45) Date of Patent: Jan. 23, 2024

(54) APPARATUS AND METHOD FOR CONTROLLING VEHICLE TO PERFORM OCCUPANT ASSISTANCE ACCORDING TO DETECTION ACCURACY OF AUTONOMOUS SENSOR

(71) Applicant: DENSO CORPORATION, Kariya (JP)

(72) Inventors: Ryo Takaki, Kariya (JP); Kouichi Masuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 450 days.

(21) Appl. No.: 17/151,493

(22) Filed: Jan. 18, 2021

(65) Prior Publication Data

US 2021/0162962 A1    Jun. 3, 2021

Related U.S. Application Data

(63) Continuation of application No. PCT/JP2019/022553, filed on Jun. 6, 2019.

(30) Foreign Application Priority Data

Jul. 20, 2018   (JP) ................................. 2018-136492

(51) Int. Cl.
*B60T 7/22* (2006.01)
*B60T 8/17* (2006.01)

(52) U.S. Cl.
CPC ....... *B60T 7/22* (2013.01); *B60T 8/17* (2013.01); *B60T 2201/022* (2013.01); *B60T 2201/03* (2013.01); *B60T 2210/32* (2013.01)

(58) Field of Classification Search
CPC ........ B60T 7/22; B60T 8/17; B60T 2201/022; B60T 2201/03; B60T 2210/32;
(Continued)

(56) References Cited

U.S. PATENT DOCUMENTS 10,311,728 B2 *  6/2019  Stenneth ............... H04L 63/123
10,399,599 B2 *  9/2019  Zegelaar ................. B62D 6/10
(Continued)

FOREIGN PATENT DOCUMENTS

JP    2005-009933 A    1/2005
JP    2011-204151 A    10/2011

*Primary Examiner* — Sze-Hon Kong
(74) *Attorney, Agent, or Firm* — MASCHOFF BRENNAN

(57) ABSTRACT

In an apparatus for controlling a vehicle equipped with an autonomous sensor and a communication unit, an object detector is configured to determine whether a predefined mobile-object condition is met, where the predefined mobile-object condition indicates that a mobile object detected from detection information received from an external device via the communication unit and a mobile object detected from detection information acquired from the autonomous sensor are the same object. An occupant assister is configured to perform occupant assistance for assisting an occupant of the vehicle, and configured to, in response to a detection accuracy condition being met, determine a mode of occupant assistance as a first mode, and in response to neither the detection accuracy condition nor the mobile-object condition being met, determine the mode of occupant assistance as a second mode is different from the first mode.

6 Claims, 4 Drawing Sheets

(58) Field of Classification Search
CPC .... B60R 21/01; B60R 21/0134; B60W 40/04; G08G 1/09; G08G 1/16
See application file for complete search history.

(56) References Cited

U.S. PATENT DOCUMENTS

| | | | | |
|---|---|---|---|---|
| 10,466,694 | B1* | 11/2019 | Fairfield | G05D 1/0044 |
| 10,761,542 | B1* | 9/2020 | Fairfield | G05D 1/0038 |
| 10,816,991 | B2* | 10/2020 | Herbach | G05D 1/0038 |
| 11,248,925 | B2* | 2/2022 | Lee | B60R 1/00 |
| 2007/0168128 | A1* | 7/2007 | Tokoro | G01S 13/867 |
| | | | | 701/301 |
| 2010/0082252 | A1 | 4/2010 | Asanuma | |
| 2012/0323473 | A1* | 12/2012 | Irie | B60W 10/20 |
| | | | | 701/117 |
| 2013/0158852 | A1* | 6/2013 | Stahlin | G08G 1/163 |
| | | | | 701/301 |
| 2013/0218448 | A1 | 8/2013 | Suzuki | |
| 2014/0249722 | A1* | 9/2014 | Hegemann | G08G 1/167 |
| | | | | 701/1 |
| 2015/0112570 | A1* | 4/2015 | Schmudderich | B60W 50/14 |
| | | | | 701/1 |
| 2018/0149740 | A1* | 5/2018 | Tamura | G01S 13/867 |
| 2018/0357493 | A1 | 12/2018 | Takamatsu et al. | |
| 2019/0061775 | A1* | 2/2019 | Emura | G08G 1/16 |
| 2019/0258878 | A1* | 8/2019 | Koivisto | G01S 7/417 |
| 2019/0279006 | A1* | 9/2019 | Ozawa | G01S 13/931 |
| 2019/0302761 | A1* | 10/2019 | Huang | G05D 1/0221 |
| 2019/0316913 | A1* | 10/2019 | Golov | G01C 21/30 |
| 2019/0384312 | A1* | 12/2019 | Herbach | G05D 1/0038 |
| 2020/0010079 | A1* | 1/2020 | Ito | B60Q 1/143 |
| 2020/0143167 | A1* | 5/2020 | Hayashi | G08G 1/017 |
| 2020/0247433 | A1* | 8/2020 | Scharfenberger | G06V 10/82 |
| 2020/0341470 | A1* | 10/2020 | Maeda | G01C 21/3885 |
| 2021/0039678 | A1* | 2/2021 | Shojima | B60W 60/0059 |
| 2021/0053580 | A1* | 2/2021 | Horiguchi | B60W 50/0097 |
| 2021/0269043 | A1* | 9/2021 | Takahashi | A61B 5/18 |
| 2021/0270634 | A1* | 9/2021 | Fujita | G01C 21/3407 |

* cited by examiner

APPARATUS AND METHOD FOR CONTROLLING VEHICLE TO PERFORM OCCUPANT ASSISTANCE ACCORDING TO DETECTION ACCURACY OF AUTONOMOUS SENSOR

CROSS REFERENCE TO RELATED APPLICATION

This application is based on Japanese Application No. 2018-136492 filed on Jul. 20, 2018, the contents of which are incorporated herein by reference.

BACKGROUND

Technical Field

The present disclosure relates to an apparatus and a method for controlling a vehicle.

Related Art

A vehicle control apparatus is known that performs driving assistance using information acquired from communication devices around an own vehicle via vehicle-to-vehicle communication or the like. In a known driving assistance system, occupant assistance is performed to assist an occupant of an own vehicle in response to information acquired via vehicle-to-vehicle communication and vehicle-to-pedestrian communication.

DESCRIPTION OF SPECIFIC EMBODIMENTS

Figure 1:
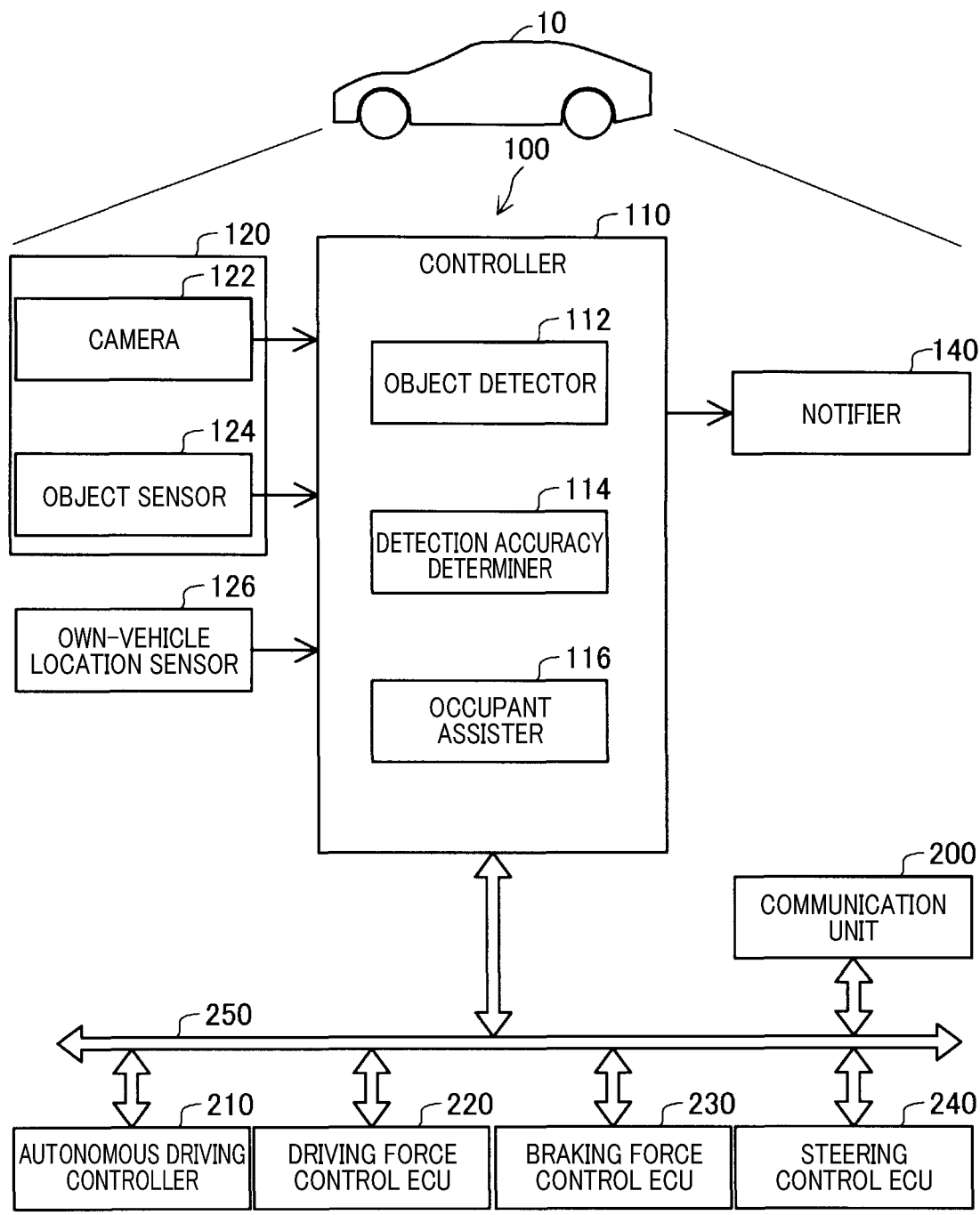
FIG. 1 is a schematic block diagram of a vehicle control apparatus.

The above known vehicle control apparatus, as disclosed in JP-A-2005-9933, determines a mode of occupant assistance in response to information acquired from communication devices around the own vehicle. However, actually, the detection accuracy of an autonomous sensor mounted to the own vehicle is not sufficiently taken into account. For example, in a case where the occupant assistance includes providing a notification of start of a preceding vehicle, low detection accuracy of the autonomous sensor may cause a false detection that the preceding vehicle has started when it has not, leading to an unnecessary notification.

In view of the foregoing, it is desired to have a technique for performing occupant assistance in response to the detection accuracy of an autonomous sensor.

A first aspect of this disclosure provides an apparatus for controlling a vehicle equipped with an autonomous sensor and a communication unit. The apparatus includes an object detector configured to detect a mobile object around the vehicle from detection information acquired from the autonomous sensor, a detection accuracy determiner configured to determine whether a detection state of the autonomous sensor meets a predefined detection accuracy condition, and an occupant assister configured to perform occupant assistance for assisting an occupant of the vehicle. The object detector is configured to determine whether a predefined mobile-object condition is met, where the predefined mobile-object condition indicates that a mobile object detected from detection information received from an external device via a communication unit and a mobile object detected from detection information acquired from the autonomous sensor are the same object. The occupant assister is configured to, in response to the detection accuracy condition being met, determine a mode of occupant assistance as a first mode of occupant assistance, and in response to neither the detection accuracy condition nor the mobile-object condition being met, determine the mode of occupant assistance as a second mode of occupant assistance that is different from the first mode of occupant assistance.

In this configuration, if neither the detection accuracy condition nor the mobile-object condition is met, the occupant assister determines the mode of occupant assistance as the second mode of occupant assistance that is different from the first mode of occupant assistance, which enables performance of occupant assistance in response to the detection accuracy of the autonomous sensor.

Hereinafter, exemplary embodiments of the present disclosure will be described in detail with reference to the accompanying drawings, in which like reference numerals refer to like or similar elements regardless of reference numerals and duplicated description thereof will be omitted.

A. First Embodiment

The vehicle control apparatus 100 illustrated in FIG. 1 performs occupant assistance of the vehicle 10. The occupant assistance will be described later. In the present embodiment, the vehicle control apparatus 100 performs autonomous driving of the vehicle 10. The vehicle 10 may be manually driven. In the present embodiment, the vehicle control apparatus 100 includes a controller 110, an autonomous sensor 120, an own-vehicle location sensor 126, a notifier 140, a communication unit 200, an autonomous driving controller 210, a driving force control electronic control unit (ECU) 220, a braking force control ECU 230, a steering control ECU 240, and an in-vehicle network 250. The controller 110, the communication unit 200, the autonomous driving controller 210, the driving force control ECU 220, the braking force control ECU 230, and the steering control ECU 240 are connected to each other via the in-vehicle network 250. As used herein the term "own vehicle" refers to a vehicle equipped with the vehicle control apparatus.

The controller 110 includes, as functional blocks, an object detector 112, a detection accuracy determiner 114, and an occupant assister 116. The controller 110 is configured as a microcomputer including a central processing unit (CPU), a read-only memory (ROM), a random-access memory (RAM), and an input/output interface (I/O). Functions of these components of the controller 110 may be implemented by the CPU executing preinstalled programs. In an alternative embodiment, some or all of these components may be implemented by hardware circuits.

The object detector 112 is configured detect a mobile object around the vehicle 10 using detection information from the autonomous sensor 120, and determines whether the detected mobile object is the same as a mobile object indicated by detection information received from an external device via the communication unit 200. As used herein the term "mobile object" is a predefined object that is mobile, such as a pedestrian, a bicycle, motorcycle, an automobile or the like. The detection accuracy determiner 114 determines whether the detection accuracy of the autonomous sensor 120 is high. The occupant assister 116 performs occupant assistance in response to the detection information and a content of determination by the detection accuracy determiner 114. As used herein the term "occupant assistance" is assistance provided to an occupant of the vehicle 10. The occupant assistance includes assisting an occupant in driving the vehicle 10 and providing a warning to a mobile object around the vehicle 10.

In the present embodiment, the occupant assistance includes, for example, adaptive cruise control (ACC), automatic braking, blind spot monitoring, lane change assistance, preceding-vehicle start notification, open-door alerting, rear-end collision alerting, and the like. The "automatic braking" is occupant assistance such that, in response to there being a danger of collision between the vehicle 10 and a mobile object, the autonomous driving controller 210 performs control to automatically decrease a travel speed of the vehicle 10 or automatically cease traveling of the vehicle 10 or provides a warning to an occupant of the vehicle 10 using a warning sound. The "blind spot monitoring" is occupant assistance such that, in response to a mobile object being detected when a lane change is made at a blind spot behind the vehicle 10 where it is difficult to identify the mobile object using a door mirror, the notifier 140 lights an indicator in the door mirror to provide a warning to the driver of the vehicle 10. The "open door alerting" is occupant assistance such that, in response to a mobile object moving toward the vehicle 10 being detected when a door of the vehicle 10 is about to be opened, the notifier 140 provides a warning to an occupant using, for example, a warning sound. The "rear-end collision alerting" is occupant assistance such that, in response to a vehicle following the vehicle 10 being detected and there being a danger of collision with the following vehicle, the notifier 140 turns on hazard lights to provide a warning to the following vehicle. The rear-end collision alerting may include tightening a seat belt in response to a high likelihood of collision and displacing the seat to an optimal position in readiness for an impact with the following vehicle. The occupant assistance may also be referred to as driving assistance.

The autonomous sensor 120 is configured to detect objects around the vehicle 10 and includes a camera 122 and an object sensor 124. The camera 122 captures images of surroundings of the own vehicle. The camera 122 may include, for example, a monocular camera or a stereo camera. The object sensor 124 is configured to detect surroundings of the own vehicle. The object sensor 124 may be an object sensor that uses reflected waves, such as Light Detection and Ranging (LIDAR), a millimeter-wave radar, an ultrasonic sensor or the like. Each of the camera 122 and the object sensor 124 may be simply referred to as a "sensor." Preferably, the autonomous sensor 120 may include a plurality of sensors.

The own-vehicle location sensor 126 is configured to detect a current location of the vehicle 10. The own-vehicle location sensor 126 may include, for example, a Global Navigation Satellite System(s) (GNSS), a gyro sensor or the like.

The notifier 140 is configured to provide a notification or a warning to an occupant of the vehicle 10 or a mobile object around the vehicle 10 in occupant assistance. The notifier 140 may be implemented by using, for example, lamps such as light-emitting diodes (LEDs), a display device for displaying drawings and characters, such as a navigation system, an audio device such as a speaker, hazard lights, or others.

The communication unit 200 is configured to receive detection information from external devices to the vehicle 10 via vehicle-to-vehicle communication, vehicle-to-pedestrian communication, vehicle-to-infrastructure communication, and the like.

The autonomous driving controller 210 is configured to control the driving force control ECU 220, the braking force control ECU 230, and the steering control ECU 240 to implement an autonomous driving function.

The driving force control ECU 220 is an electronic control unit configured to control an actuator that generates vehicle driving forces, such as a motor or the like. During manual driving by the driver, the driving force control ECU 220 controls a power source, such as an engine, an electric motor or the like, in response to a depression amount of an accelerator pedal. During autonomous driving, the driving force control ECU 220 controls the power source in response to a requested driving force calculated by the autonomous driving controller 210.

The braking force control ECU 230 is an electronic control unit configured to control a braking actuator that generates vehicle braking forces. During manual driving by the driver, the braking force control ECU 230 controls the braking actuator in response to a depression amount of a brake pedal. During autonomous driving, the braking force control ECU 230 controls the braking actuator in response to a requested braking force calculated by the autonomous driving controller 210.

The steering control ECU 240 is an electronic control unit configured to control a motor that generates steering torque. During manual driving by the driver, the steering control ECU 240 controls the motor in response to the operation of the steering wheel to generate an assist torque for the steering operation. This allows the driver to perform the steering operation with a small amount of force, thereby implementing steering of the vehicle. During autonomous driving, the steering control ECU 240 controls the motor in response to a requested steering angle calculated by the autonomous driving controller 210 to perform steering.

Figure 2:
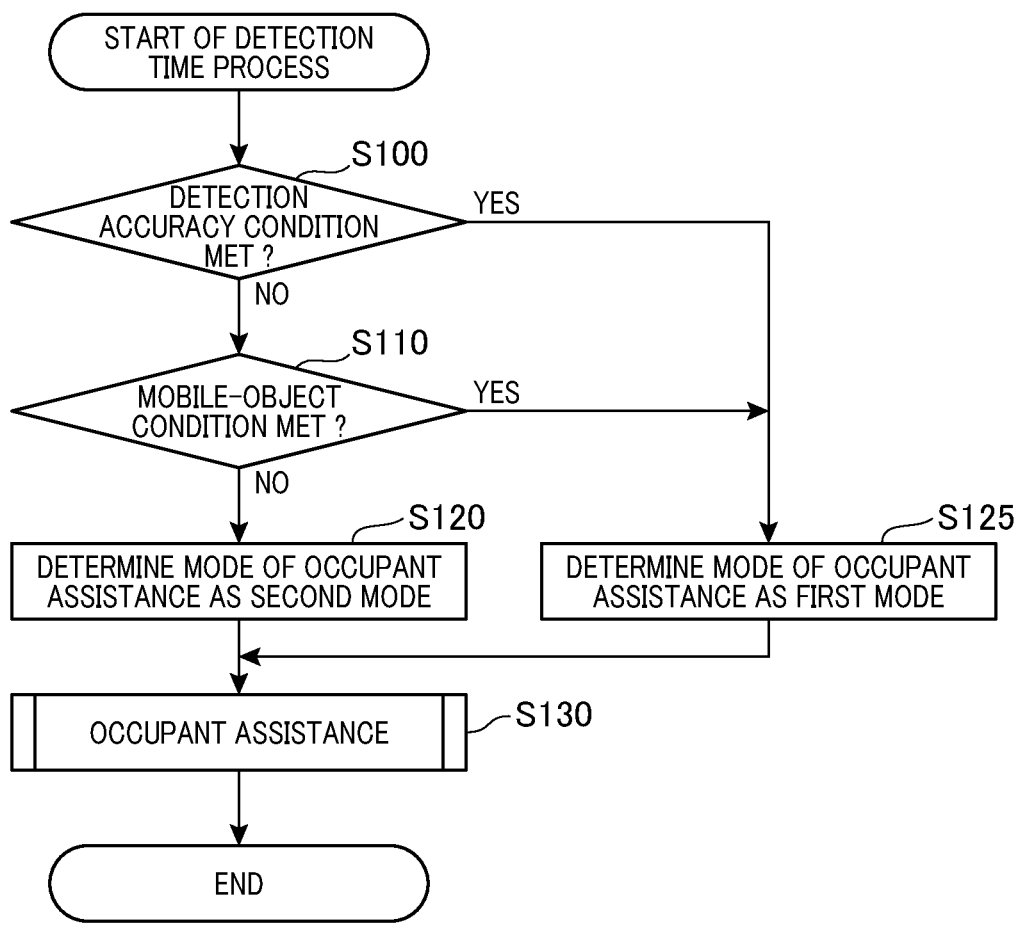
FIG. 2 is a flowchart of a detection time process, that is, a process performed upon detection of a mobile object.

A detection time process illustrated in FIG. 2 includes a series of operational steps for determining a mode of occupant assistance in response to the detection accuracy of the autonomous sensor 120. During operation of the vehicle control apparatus 100, the detection time process is performed repeatedly by the controller 110 in response to the object detector 112 detecting a mobile object from detection information from the autonomous sensor 120.

At step S100, the detection accuracy determiner 114 determines whether a detection state of the autonomous sensor 120 meets a detection accuracy condition. If the detection accuracy condition is met, it may be determined that the detection accuracy of the autonomous sensor 120 is high. For example, at least one of the following conditions may be employed as the detection accuracy condition.

First detection accuracy condition: Two or more of a plurality of sensors of the autonomous sensor 120 have detected a mobile object. Second detection accuracy condition: It is not poor weather. More specifically, it is not, for example, rainy weather, snowy weather, or foggy weather. Third detection accuracy condition: It is not nighttime. More specifically, it is, for example, between the time of sunrise and the time of sunset. Fourth detection accuracy condition: It is not backlit, more specifically, for example, the travel direction of the vehicle 10 is not directed toward the sun when the sun is at a low position. Fifth detection accuracy condition: The whole of the mobile object is within a spatial detection range of the autonomous sensor 120. Sixth detection accuracy condition: Mobile objects detected from detection information from the respective sensors of the autonomous sensor 120 are the same object.

If the first detection accuracy condition is not met, only one sensor has detected a mobile object. In such a case, there is likely a false detection and thus the detection accuracy may be estimated to be low. Therefore, preferably, the detection accuracy condition includes the first detection accuracy condition.

If the second detection accuracy condition is not met, for example, if it is rainy weather, the detection accuracy of the LIDAR that is the object sensor 124 decreases. The weather may be acquired from an external server via the communication unit 200. In an alternative embodiment, the weather may be determined by detecting raindrops using image recognition or a rain sensor.

If the third detection accuracy condition is not met, the detection accuracy of the camera 122 decreases due to reduced contrast arising from backlighting or reduced intensity of illumination of headlights of an oncoming vehicle. The times of sunrise and sunset may be acquired from an external server via the communication unit 200. In an alternative embodiment, instead of using of the times of sunrise and sunset, it may be determined that it is not nighttime if the light level detected by a light-level sensor for detecting the brightness in the outside of the vehicle is equal to or greater than a predetermined threshold.

If the fourth detection accuracy condition is not met, for example, if the travel direction of the vehicle 10 is directed toward the sun during sunset, that is, when the sun is at a low position, the detection accuracy of the camera 122 decreases due to backlighting of the sun. The position of the sun may be acquired from an external server via the communication unit 200.

If the fifth detection accuracy condition is not met, that is, if only a portion of a mobile object is within the spatial detection range of the autonomous sensor 120, the detection accuracy may be estimated to be low. The detection range of the autonomous sensor 120 may be marginally greater than in the specification of each sensor or may be changed depending on a travel condition, such as the weather, the time of day or the like. For example, the detection range of the camera 122 during nighttime may be considered to be shorter than during daytime. The detection range of the object sensor 124 when it is raining or snowing may be considered to be shorter than when it is not raining or snowing.

If the sixth detection accuracy condition is not met, there is likely a false detection and thus the detection accuracy may be estimated to be low. A determination as to whether mobile objects detected from detection information from the respective sensors of the autonomous sensor 120 are the same object is made based on whether a mobile-object condition described later is met.

The above first to sixth detection accuracy conditions and other detection accuracy conditions may be appropriately combined to provide a detection accuracy condition. In the present embodiment, the first detection accuracy condition is used.

If the detection accuracy condition is met, that is, if the detection accuracy of the autonomous sensor 120 is determined to be high, the process flow proceeds to step S125, and the occupant assister 116 determines the mode of occupant assistance as the first mode of occupant assistance.

If the detection accuracy condition is not met, that is, if the detection accuracy of the autonomous sensor 120 is determined to be low, the process flow proceeds to step S110. At step S110, the object detector 112 determines whether the mobile-object condition is met. The mobile-object condition is a predefined condition indicating that a mobile object detected from detection information acquired from the autonomous sensor 120 (hereinafter referred to as a "first mobile object") and a mobile object detected from detection information received from an external device via the communication unit 200 of the vehicle 10 (hereinafter referred to as a "second mobile object") are the same object. If this mobile-object condition is met, it may be determined that the detection information acquired from the autonomous sensor 120 is not a false detection. For example, one or more of the following conditions may be employed to provide the mobile-object condition.

First mobile-object condition: A difference in position between the first mobile object and the second mobile object is less than a predetermined value. Second mobile-object condition: A difference in speed between the first mobile object and the second mobile object is less than a predetermined value. Third mobile-object condition: A difference in acceleration between the first mobile object and the second mobile object is less than a predetermined value. Fourth mobile-object condition: A difference in width between the first mobile object and the second mobile object is less than a predetermined value. Fifth mobile-object condition: A difference in height between the first mobile object and the second mobile object is less than a predetermined value. Sixth mobile-object condition: A difference in depth between the first mobile object and the second mobile object is less than a predetermined value. Seventh mobile-object condition: The first mobile object and the second mobile object are of the same type. A determination as to whether the seventh mobile-object condition is met may be made by, for example, estimating a type of a mobile object using pattern matching. In the present embodiment, the term "type" means distinguishing between a four-wheel vehicle, a two-wheel vehicle, and a pedestrian. A bicycle and a motorcycle may be treated as different types. A cargo truck and a passenger car may be treated as different types. A bicycle and a pedestrian moving in the longitudinal direction of the vehicle 10 may be treated as the same type.

The above first to seventh mobile-object conditions and other mobile-object conditions may be appropriately combined to provide a mobile-object condition. For example, the first to sixth mobile-object conditions are used and the difference in each of the first to sixth mobile-object conditions is weighted. It may be determined that a mobile-object condition is met if the weighted value of difference in each mobile-object condition is equal to or less than a respective predetermined value. In the present embodiment, the above first to seventh mobile-object conditions are used.

If the mobile-object condition is met, that is, if it can be determined that the first mobile object and the second mobile object are the same mobile object, the process flow proceeds to step S125. At step S125, the occupant assister 116 determines the mode of occupant assistance as the first mode of occupant assistance. If the mobile-object condition is not met, that is, if it can be determined that the first mobile object and the second mobile object are not the same mobile object, the process flow proceeds to step S120. At step S120, the occupant assister 116 determines the mode of occupant assistance as the second mode of occupant assistance that is different from the first mode of occupant assistance. In the present embodiment, the second mode of occupant assistance is performed at a timing later than the first mode of occupant assistance. Finally, at step S130, the occupant assister 116 performs the occupant assistance. In the present embodiment, automatic braking will now be described as an example of occupant assistance.

Figure 3:
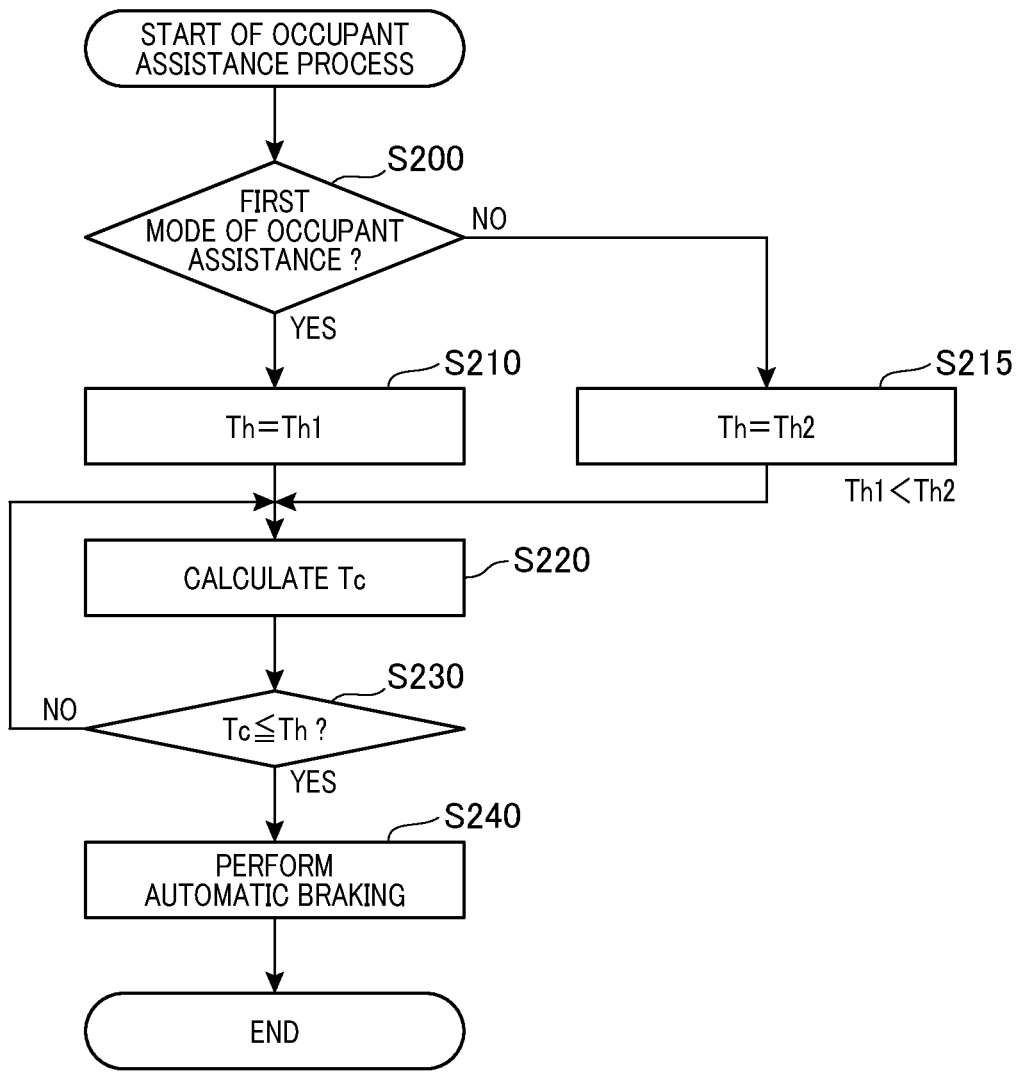
FIG. 3 is a flowchart of an occupant assistance process.

In the occupant assistance process illustrated in FIG. 3 (at step S130 in FIG. 2), at step S200, the occupant assister 116 determines whether the mode of occupant assistance is the first mode of occupant assistance. If the mode of occupant assistance is the first mode of occupant assistance, the process flow proceeds to step S210. At step S210, the occupant assister 116 determines a threshold Th for the expected time to collision Tc as a first value Th1. The expected time to collision Tc will be described later. If the mode of occupant assistance is not the first mode of occupant assistance, that is, if the mode of occupant assistance is the second mode of occupant assistance, the process flow proceeds to step S215. At step S215, the occupant assister 116 determines the threshold Th for the expected time to collision Tc as a second value Th2 that is greater than the first value Th1.

Subsequently, at step S220, the occupant assister 116 calculates an expected time to collision Tc. The expected time to collision Tc can be calculated according to the following equation (1).

$$Tc = \Delta L / \Delta V \quad (1)$$

Figure 4:
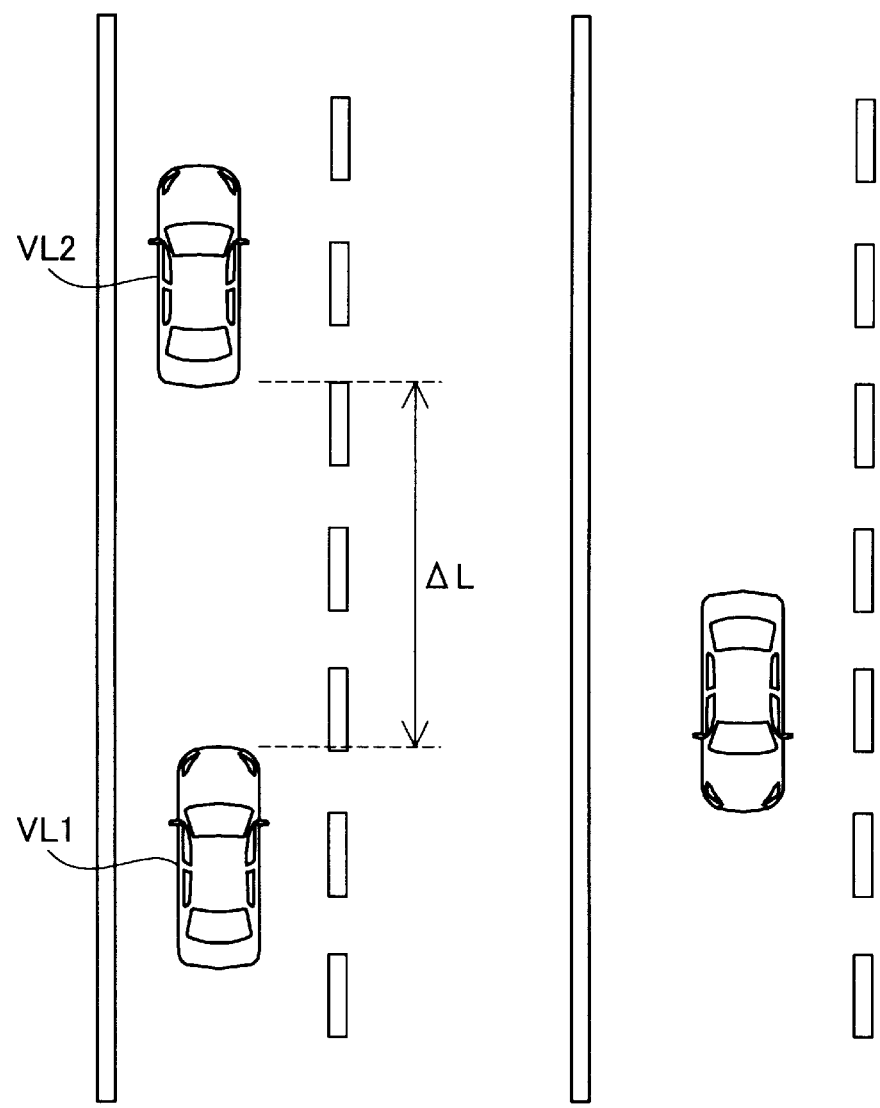
FIG. 4 is an illustration of an example of automatic braking.

As illustrated in FIG. 4, $\Delta L$ is a distance between the own vehicle VL1 and a mobile object VL2. $\Delta V$ is a relative speed between the own vehicle VL1 and the mobile object VL2. A position and a speed of the mobile object VL2 may be acquired using only detection information from the autonomous sensor 120, using only detection information received via the communication unit 200, or using information acquired by a fusion process in which the detection information from the autonomous sensor 120 and the detection information received via the communication unit 200 are fused or combined, for example, a simple average or a weighted average depending on positions and types of sensors is calculated.

Subsequently, at step S230, the occupant assister 116 determines whether the expected time to collision Tc is equal to or less than the threshold Th. If the expected time to collision Tc is equal to or less than the threshold Th, the process flow proceeds to step S240. At step S240, the occupant assister 116 notifies the braking force control ECU 230 of a command to actuate the brakes. If the expected time to collision Tc is greater than the threshold Th, the process flow returns to step S220. That is, steps S220 and S230 are repeated until the expected time to collision Tc is less than or equal to the threshold Th. In some embodiments, if a predetermined time period has elapsed or a distance between the own vehicle VL1 and the mobile object VL2 is greater than a predetermined distance, then the process flow may end.

With the vehicle control apparatus 100 set forth above according to the present embodiment, if the detection accuracy condition is not met and a mobile object detected by the autonomous sensor 120 is not detected from detection information received from an external device via the communication unit 200, the occupant assister 116 determines the mode of occupant assistance as the second mode of occupant assistance that is different from the first mode of occupant assistance. This enables performance of occupant assistance in response to the detection accuracy of the autonomous sensor 120. In cases where the detection accuracy of the autonomous sensor 120 is high, various types of occupant assistance may be performed even in the absence of communication devices around the vehicle 10.

B. Modifications

In an alternative embodiment to the embodiment set forth above, the occupant assister 116 may determine information about the mobile object VL2 used in the occupant assistance process according to the detection accuracy of the autonomous sensor 120. For example, if the detection accuracy condition is met, only detection information from the autonomous sensor 120 may be used, but detection information received from an external device via the communication unit 200 may not be used. If the detection accuracy condition is not met and the mobile-object condition is met, information may be used that is acquired by fusion-processing detection information from the autonomous sensor 120 and detection information received from an external device via the communication unit 200. If neither the detection accuracy condition nor the mobile-object condition is met, only detection information received from an external device via the communication unit 200 may be used.

In the embodiment set forth above, occupant assistance is performed in the second mode of occupant assistance at a later timing than in the first mode of occupant assistance. In an alternative embodiment, occupant assistance is performed in the second mode of occupant assistance to a lesser extent than in the first mode of occupant assistance. In an example where occupant assistance includes providing a warning sound, the warning sound may be provided more softly in the second mode of occupant assistance than in the first mode of occupant assistance, or a duration of a warning sound in the second mode of occupant assistance may be less than a duration in the first mode of occupant assistance. In another example where occupant assistance includes illuminating an indicator, the indicator is lit at a lower illuminance level in the second mode of occupant assistance than in the first mode of occupant assistance. In still another example where occupant assistance includes performing adaptive cruise control (ACC), acceleration and deceleration rates may be lower in the second mode of occupant assistance than in the first mode of occupant assistance, or upper and lower limits of inter-vehicle distance or upper and lower limits of inter-vehicle time in the first and second modes of occupant assistance may be changed. The term "inter-vehicle time" is an inter-vehicle distance divided by a speed of the own vehicle VL1. In addition, different modes of occupant assistance may correspond to different functions of occupant assistance.

In an alternative embodiment to the embodiment set forth above, the occupant assister 116 may determine the mode of occupant assistance as the second mode of occupant assistance in response to the detection accuracy of the autonomous sensor 120. For example, in a case where a mobile object is detected by only one sensor within spatial detection ranges of the plurality of sensors, there is likely a false detection and the detection accuracy is low as compared to a case where a mobile object is detected by only a certain sensor within a spatial detection range of the certain sensor. Therefore, in such a case, the occupant assister 116 may determine the mode of occupant assistance as a mode such that occupant assistance is performed to a lesser extent.

In the embodiment set forth above, the object detector 112 determines whether a mobile object detected from detection information acquired from the autonomous sensor 120 (i.e., a first mobile object) and a mobile object detected from detection information received from an external device via the communication unit 200 of the vehicle 10 (i.e., a second mobile object) are the same object. In an alternative embodiment, the object detector 112 may further determine whether mobile objects detected from detection information received from a plurality of external devices via the communication unit 200 of the vehicle 10 are the same object. In determining whether the first mobile object and the second mobile object are the same object, the object detector 112 may determine a mobile object detected by the maximum number of external devices as the second mobile object.

In an alternative embodiment to the embodiment set forth above, if the sixth detection accuracy condition is not met, the object detector 112 may determine a mobile object detected by the minimum number of sensors as a first mobile object. In a case where such a mobile object is not moving, there is less likely a false detection as compared to cases where a mobile object is moving. Therefore, in such a case where the mobile object detected by the minimum number of sensors is not moving, a mobile object detected by the second minimum number of sensors may be determined as a first mobile object.

In the present embodiment, the autonomous driving controller 210 may be configured to determine a mode of driving assistance in response to the detection accuracy in a similar manner as in the occupant assistance. For example, in a case where neither the detection accuracy condition nor the mobile-object condition is met, the autonomous driving controller 210 may determine the mode of driving assistance as a mode of driving assistance such that, in autonomous driving, braking is performed at a timing later as compared to a case where the detection accuracy condition is met.

The present disclosure is not limited to any of the embodiments set forth above, the examples and the modifications described above but may be implemented by a diversity of other configurations without departing from the scope of the disclosure. For example, the technical features of the embodiments, examples or modifications corresponding to the technical features of the respective aspects may be replaced or combined appropriately, in order to solve part or all of the issues described above or in order to achieve part or all of the advantages described above. Any of the technical features may be omitted appropriately unless the technical feature is described as essential herein.

What is claimed is:

1. An apparatus for controlling a vehicle, comprising:
a non-transitory memory storing one or more computer programs;
a processor executing the one or more computer programs to:
detect a mobile object around the vehicle from detection information acquired from an autonomous sensor mounted to the vehicle;
determine whether a detection state of the autonomous sensor meets a predefined detection accuracy condition;
perform occupant assistance for assisting an occupant of the vehicle,
wherein the processor further executes one or more programs to:
after determining whether the detection state of the autonomous sensor meets the predefined detection accuracy condition, determine whether a predefined mobile-object condition is met, the predefined mobile-object condition indicating that a mobile object detected from detection information received from an external device via a communication unit mounted to the vehicle and a mobile object detected from detection information acquired from the autonomous sensor are the same object, and
in response to the detection accuracy condition being met, determine a mode of occupant assistance as a first mode of occupant assistance, and
in response to neither the detection accuracy condition nor the predefined mobile-object condition being met, determine the mode of occupant assistance as a second mode of occupant assistance that is different from the first mode of occupant assistance, the second mode of occupant assistance being to be performed at a timing later than the first mode of occupant assistance.

2. The apparatus according to claim 1, wherein
the mobile object detected from the detection information acquired from the autonomous sensor is referred to as a first mobile object,
the mobile object detected from the detection information received from the external device via the communication unit is referred to as a second mobile object, and
the predefined mobile-object condition comprises:
at least one of a first mobile-object condition that a difference in position between the first mobile object and the second mobile object is less than a predetermined value, a second mobile-object condition that a difference in speed between the first mobile object and the second mobile object is less than a predetermined value, a third mobile-object condition that a difference in acceleration between the first mobile object and the second mobile object is less than a predetermined value, a fourth mobile-object condition that a difference in width between the first mobile object and the second mobile object is less than a predetermined value, a fifth mobile-object condition that a difference in height between the first mobile object and the second mobile object is less than a predetermined value, a sixth mobile-object condition that a difference in depth between the first mobile object and the second mobile object is less than a predetermined value; or
a seventh mobile-object condition that the first mobile object and the second mobile object are of the same type.

3. The apparatus according to claim 1, wherein
the occupant assistance includes automatic braking to automatically decelerate or cease traveling of the vehicle.

4. The apparatus according to claim 1, wherein
the autonomous sensor comprises a plurality of sensors, and the detection accuracy condition comprises a condition that the mobile object is detected by two or more of the plurality of sensors.

5. A method for controlling a vehicle, comprising:
determining whether a detection state of an autonomous sensor mounted to the vehicle meets a predefined detection accuracy condition;
determining whether a predefined mobile-object condition is met, the predefined mobile-object condition indicating that a mobile object detected from detection information received from an external device via a communication unit mounted to the vehicle and a mobile object detected from detection information acquired from the autonomous sensor are the same object, determining a mode of occupant assistance as a first mode of occupant assistance in response to the detection accuracy condition being met, and determining the mode of occupant assistance as a second mode of occupant assistance that is different from the first mode of occupant assistance in response to neither the detection accuracy condition nor the predefined mobile-object condition being met, wherein the second mode of occupant assistance is performed at a timing later than the first mode of occupant assistance.

6. The apparatus according to claim 1, wherein the predefined detection accuracy condition being met indicates that the detection accuracy of the autonomous sensor is high, and the predefined detection accuracy condition not being met indicates that the detection accuracy of the autonomous sensor is low.

* * * * *